No. 666,144. Patented Jan. 15, 1901.
J. KENNEDY.
SHAFT COUPLING.
(Application filed July 12, 1899.)
(No Model.) 3 Sheets—Sheet 1.
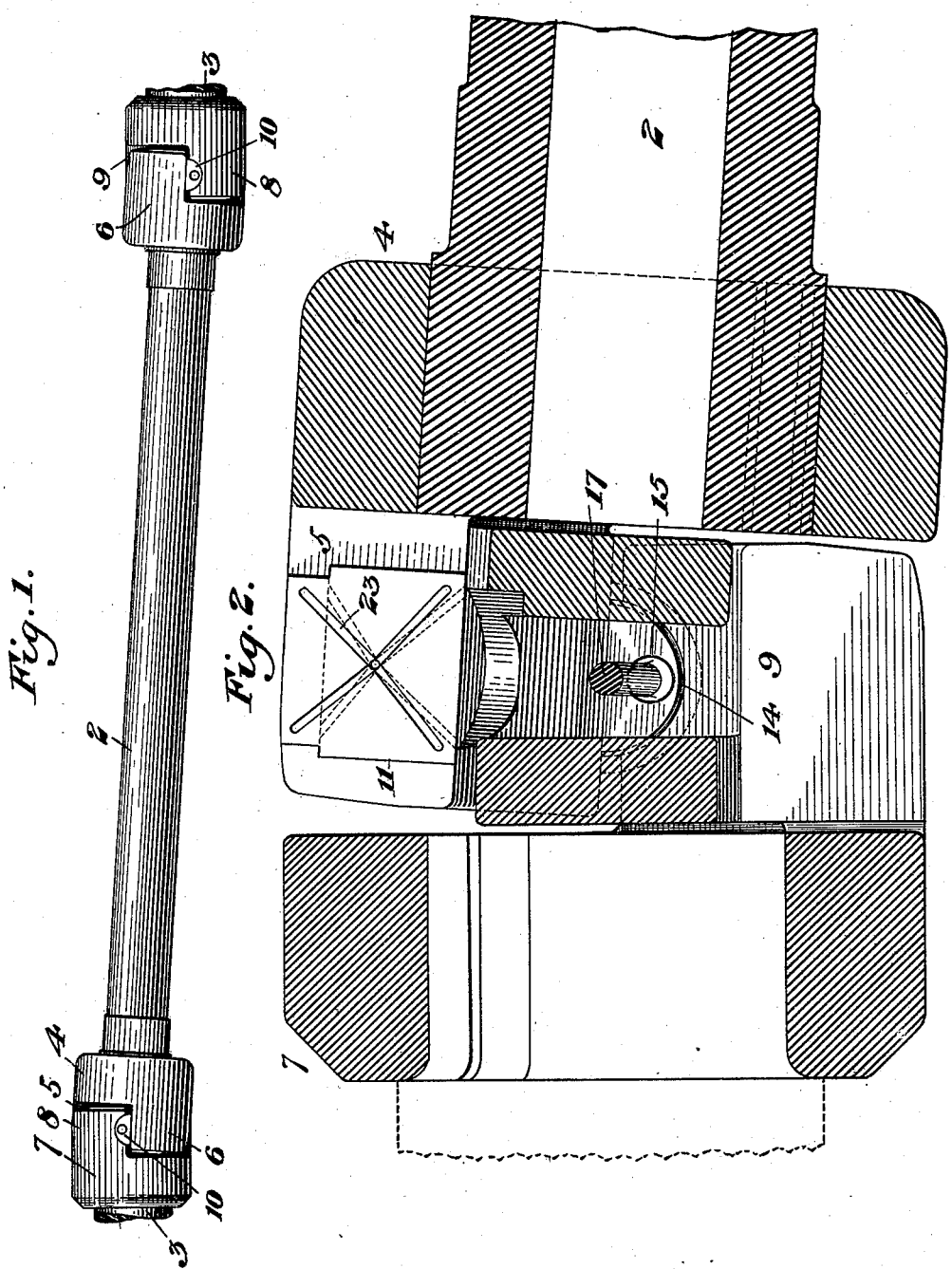
WITNESSES
INVENTOR No. 666,144. Patented Jan. 15, 1901.
J. KENNEDY.
SHAFT COUPLING.
(Application filed July 12, 1899.)
(No Model.) 3 Sheets—Sheet 2.

WITNESSES
INVENTOR

No. 666,144. Patented Jan. 15, 1901.
J. KENNEDY.
SHAFT COUPLING.
(Application filed July 12, 1899.)
(No Model.) 3 Sheets—Sheet 3.
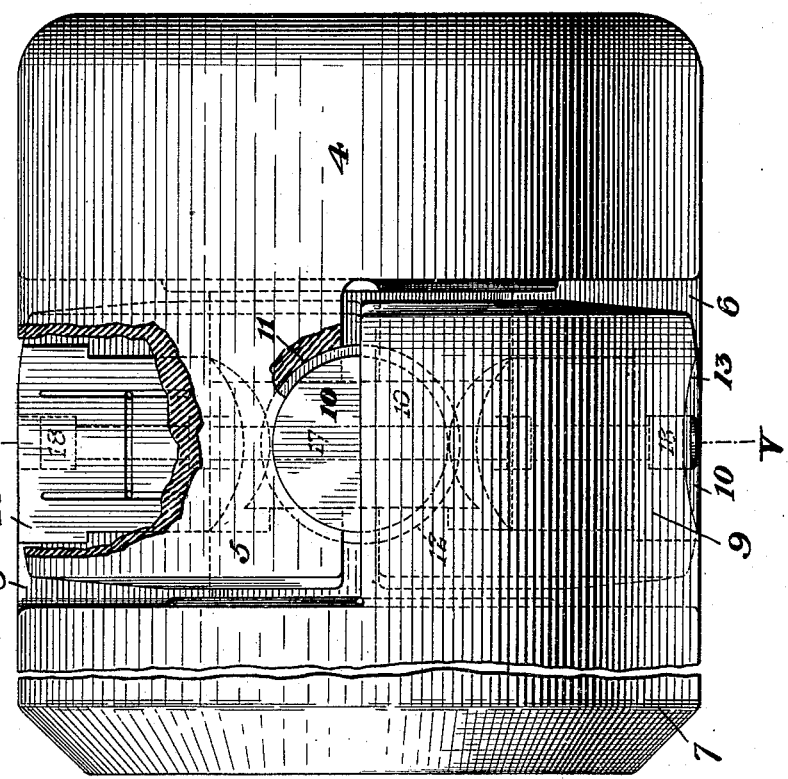
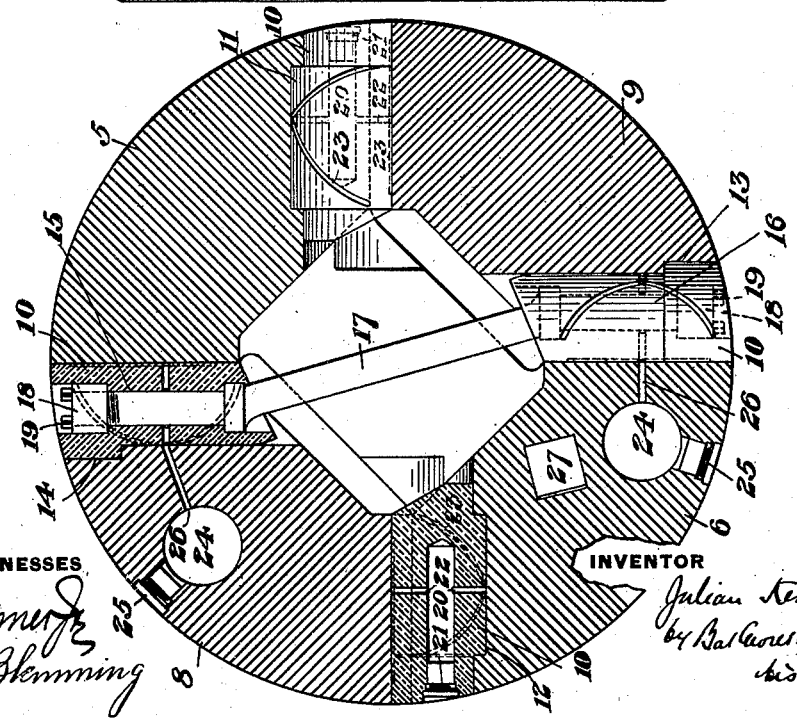
WITNESSES
INVENTOR

UNITED STATES PATENT OFFICE.

JULIAN KENNEDY, OF PITTSBURG, PENNSYLVANIA.

SHAFT-COUPLING.

SPECIFICATION forming part of Letters Patent No. 666,144, dated January 15, 1901.

Application filed July 12, 1899. Serial No. 723,531. (No model.)

*To all whom it may concern:*

Be it known that I, JULIAN KENNEDY, of Pittsburg, in the county of Allegheny and State of Pennsylvania, have invented a new and useful Improvement in Shaft-Couplings, of which the following is a full, clear, and exact description, reference being had to the accompanying drawings, forming part of this specification, in which—

Figure 4:
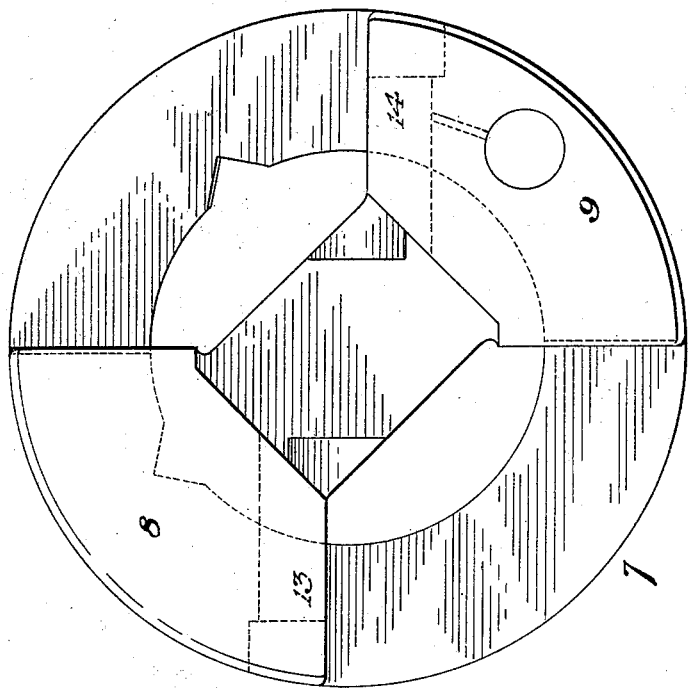
Figure 3:
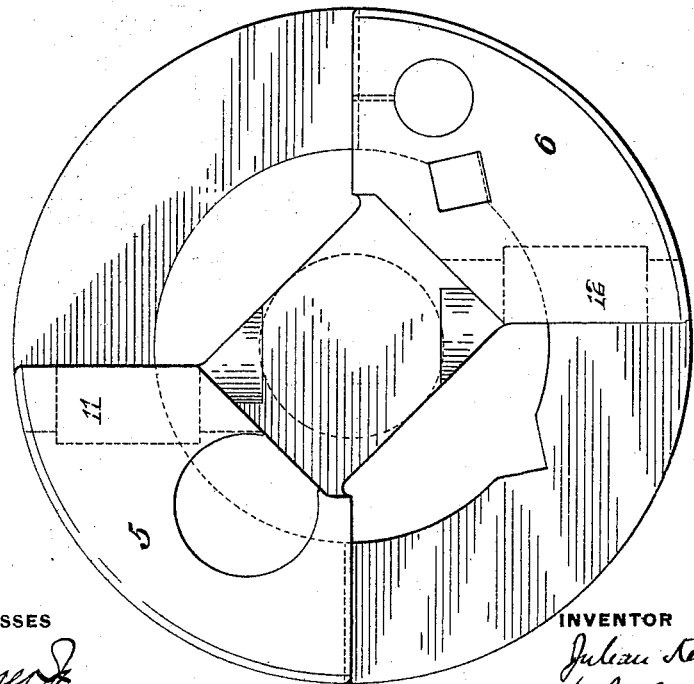

Figure 1 is a side elevation of my improved universal coupling. Fig. 2 is an enlarged vertical section showing the connection at one end of the spindle. Figs. 3 and 4 are end elevations of the spindle-coupling and the pinion and roll-couplings, respectively. Fig. 5 is a vertical cross-section on the line V V of Fig. 6; and Fig. 6 is a side elevation, partly broken away, of the coupling, the parts being in alinement.

My invention relates to the end couplings employed between rotating shafts and more especially to the wabbler connection employed between a driving-shaft and a pinion or roll in rolling-mills.

In the drawings, 2 represents a spindle, and 3 3 roll or pinion shafts rotatably connected by the spindle.

The coupling at each end of the spindle is the same, and I shall therefore describe but one of them.

The enlarged coupling portion 4 of the spindle is provided with two oppositely-located projecting jaws 5 and 6 of segmental shape, with their side faces on radial planes extending through the axis of the spindle. The coupling portion 7 of the roll or pinion shaft is provided with oppositely-located projecting jaws 8 and 9, similar to the jaws of the spindle-coupling, and these four jaws are arranged to interfit with each other when the parts are assembled. One face of each jaw is provided with a recess of semicylindrical form, and in each of the four recesses thus formed in the coupling is placed a block or brass 10 of semicylindrical form, its curved face fitting within the curved recess of its jaw and its flat face bearing on the radial face of the adjacent jaw.

To hold the brasses in their position and prevent their sliding out endwise, I preferably form the recesses 11 and 12 in one of the coupling ends, which I have shown as the spindle-coupling, with intermediate enlarged portions in which correspondingly-large portions of the brasses therefor fit. These two brasses are inserted before the jaws are moved into engagement with each other. The recesses 13 and 14 for the other two brasses are provided with enlarged portions at their outer ends, in which fit the correspondingly-enlarged outer heads of the other two brasses. These latter brasses are provided with longitudinal holes, through which extend stems 15 and 16, forming the outer end portions of a bolt 17, the intermediate portion of which extends diagonally and across the axis of the coupling. These brasses are slipped into place over the stems and are held by nuts 18, which engage the screw-threaded ends of the bolt and may be provided with pins 19 for turning them to place.

To oil the bearing-surfaces of the semicylindrical blocks or brasses, I provide the two brasses in the recesses 11 and 12 with outwardly-opening cavities 20, which form oil-reservoirs and are closed by plugs 21. From the cavity 20 holes 22 lead to grooves 23, formed in the bearing-surfaces of the brasses. To oil the other two brasses, I form cavities 24 in the adjacent jaws, provided with closing-plugs 25 and from which holes 26 lead to and through the brasses, connecting with the oiling-grooves on their faces. The coupling-heads may be secured to the ends of the shafts by taper keys 27 or other suitable means.

The operation of the parts is apparent. The shaft ends, which are connected by the spindle, being somewhat out of alinement, as the couplings rotate the flat face of each jaw will slide over the flat face of the brass in the recess of the next jaw and the brasses will rock or turn in their recesses. The opposite brasses are reversed in position from each other—that is, when the curved face of one brass is uppermost the curved face of the opposite brass is underneath, so that, as shown in Fig. 6, the two opposite brasses form a complete circle or cylinder. I have found in practice that it is necessary that each jaw should have the brass in one of its faces while the other face bears and slides on the brass of the next jaw. An easy smooth movement is thus afforded, with little or no lost motion in the part.

The advantages of the invention result from its doing away with the old wabbler connections, in which on account of the necessary lost motion the enormous blows exerted on starting or reversing soon injure the connections and break them out. Their life was therefore short, although very thick heavy lubricants were used. In my construction these difficulties are done away with, the rocking and sliding movements of the couplings being smooth and uniform and there being no opportunity for striking blows upon their parts. The flat meeting faces of the brasses and the jaws allow great pressures to be exerted without injuring the parts, and thus peculiarly adapt the device for use in rolling-mills where the parts are subjected to great strain.

Many changes may be made in the form and arrangement of the jaws, the method of securing the brasses, and in the other parts without departing from my invention, since I claim—

1. A universal coupling having interfitting jaws with open-ended recesses, semicylindrical bearing-blocks interposed between the jaws, and fitting in the recesses and means for retaining the blocks in place, substantially as described.

2. A universal coupling, having interfitting jaws, each jaw having in one face a curved recess with an open outer end and containing a semicylindrical block or brass, and its other face bearing upon the flat face of the semicylindrical brass in the adjacent jaw and means for holding the blocks in place; substantially as described.

3. A universal coupling, having interfitting jaws, with interposed curved brasses, two of the brasses having a connecting-bolt arranged to hold them against endwise movement; substantially as described.

In testimony whereof I have hereunto set my hand.

JULIAN KENNEDY.

Witnesses:
H. M. CORWIN,
G. B. BLEMMING.